UNITED STATES PATENT OFFICE.

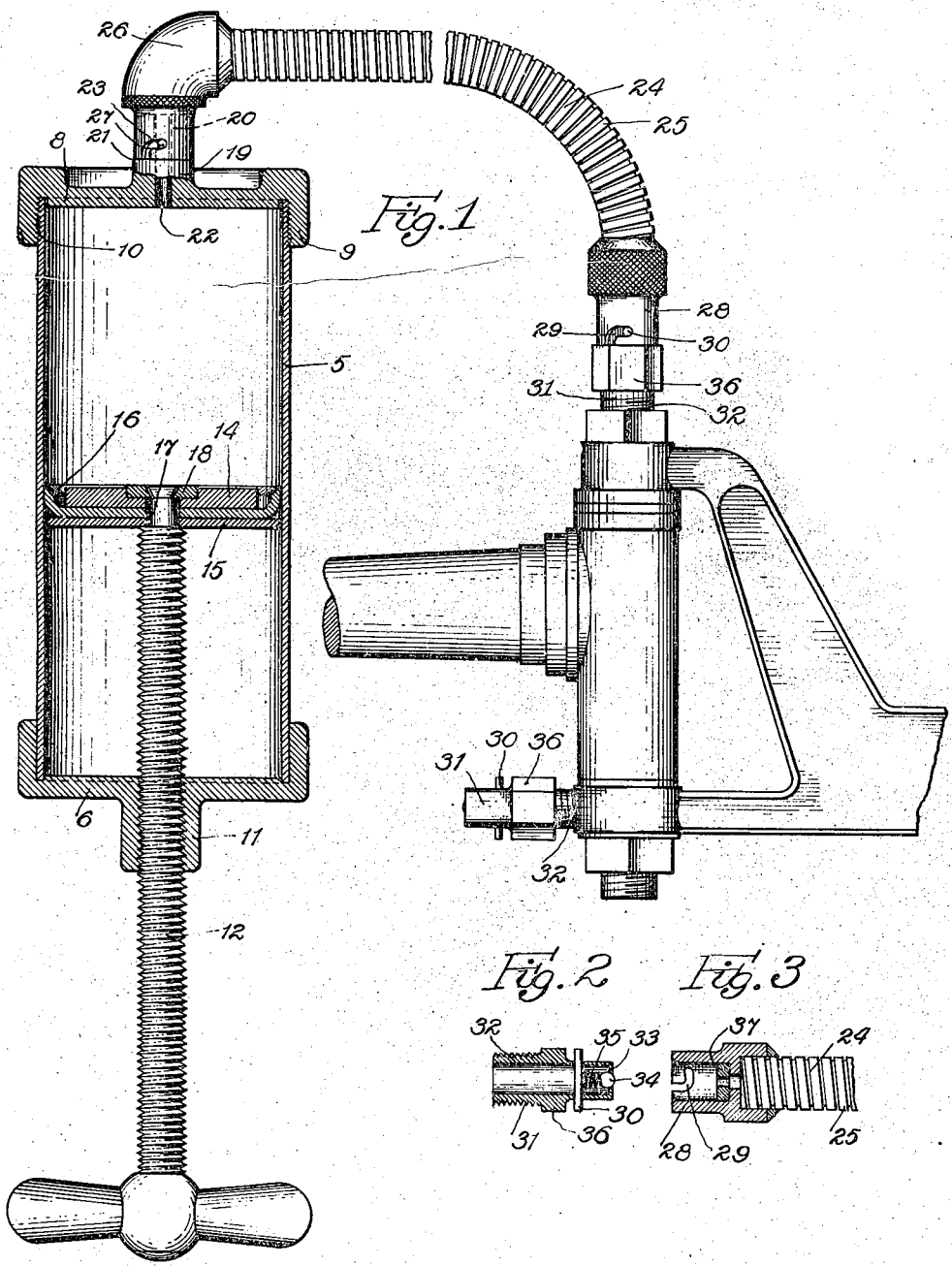

ARTHUR V. GULLBORG, OF CHICAGO, ILLINOIS.

LUBRICATING APPARATUS.

1,307,733.   Specification of Letters Patent.   Patented June 24, 1919.

Application filed February 11, 1918. Serial No. 216,586.

*To all whom it may concern:*

Be it known that I, ARTHUR V. GULLBORG, a citizen of the United States, residing at Chicago, in the county of Cook and State of Illinois, have invented a certain new and useful Improvement in Lubricating Apparatus, of which the following is a full, clear, concise, and exact description, reference being had to the accompanying drawings, forming a part of this specification.

This invention relates to lubricating apparatus and is particularly concerned with the provision of means for supplying lubricating grease to bearings which are more or less inaccessible. One object of my invention is to provide means of the character described comprising a novel grease pump which coöperates with a grease cup of novel construction to entirely fill the grease cup without wasting any of the lubricating grease. Another object of my invention is to provide a grease pump having a flexible discharge conduit. A still further object of my invention is to provide a grease pump having a flexible discharge conduit provided with means for interchangeably locking either end thereof to said grease pump or to the grease cups which are being filled by the grease pump, and a still further object is to provide a flexible discharge conduit for my improved grease pump one end of said conduit being provided with a straight coupling and the other end thereof being provided with an L-shaped coupling, whereby, by the use of either one or the other of these couplings it is possible to obtain access to grease cups in comparatively inaccessible places. Other objects, adaptabilities, and capabilities will appear as the description progresses, reference being had to the accompanying drawings, in which—

Figure 1 illustrates my improved grease pump supplying grease to one of my novel grease cups, the grease pump being shown partially in longitudinal section. In this view my improved grease cups are shown applied to a steering knuckle of an automobile;

Fig. 2 is a longitudinal section through my improved grease cup; and

Fig. 3 is a longitudinal section through one of the coupling members.

Referring to the drawings, the reference character 5 indicates the barrel of my improved grease pump, one end of which is closed by a head 6, which may be soldered or otherwise secured to the end of the barrel. The opposite end of the barrel is closed by the head 8, which has an internally threaded flange 9 for receiving the external threads 10 on the end of the barrel. The head 6 is provided with a central boss 11, which is provided with a screwthreaded bore for receiving the screwthreaded piston rod 12. The rod 12 is provided with a handle 13 for rotating the same. The inner end of the rod 12 has a piston mounted thereon which comprises the spaced disks 14 and 15 between which is confined the cup leather 16, the two disks 14 and 15 and the cup leather being rotatably mounted upon the reduced end 17 of the piston rod and retained in place by means of a washer 18, through which the end of the piston rod extends and is riveted over to secure the washer thereto.

The head 8 is provided with a central boss 19 having a reduced portion 20, shown in dotted lines in Fig. 1, forming a shoulder 21 and a discharge opening 22 formed therethrough. A pin 23 extends through the reduced portion 20 and from both sides thereof. The discharge conduit 24 is formed from a piece of flexible duct, preferably comprising an outer spiral metallic rib 25. There are numerous flexible ducts in commercial use which may be employed for this part of my invention, and further description thereof appears to be unnecessary. At one end of the duct 24 I provide an L-shaped coupling 26 having bayonet slots 27, one of which is not shown, which co-act with the opposite ends of the pin 23 to secure the coupling to the pump. The opposite end of the conduit 24 is provided with a straight coupling 28 having bayonet slots 29, one of which is not shown, for co-acting with the opposite ends of the pin 30 of my novel grease cup.

From the above description it will be clear that either coupling member can be connected with either the pump or with the grease cup. By using the L-shaped coupling for connecting with the grease cup it is sometimes possible to gain access to a grease cup which would not otherwise be accessible.

My novel grease cup comprises a tubular member 31 having the screwthreads 32 at one end thereof for securing them to a bearing, and the other end thereof being flanged inwardly as shown at 33, for the purpose of providing a seat for the ball closure 34. This closure is urged against its seat by means of a compression spring 35, which is confined between the pin 30 and the closure 34. The central portion of my grease cup is hexagonal in cross section, as indicated at 36, thereby providing means for receiving the jaws of a wrench to screw the cup into place.

In Fig. 3 the reference character 37 indicates a gasket made of felt or other suitable material for sealing the connection between the coupling and the grease cup. From this construction it will be seen that when the coupling member is secured to the grease cup by means of the bayonet connection, there will be no chance for the grease to escape between these two members when the piston rod 12 is rotated to force the piston inwardly, and thereby force the grease into the grease cup. This is an improved feature of my invention, for the reason that in prior grease pumps with which I am acquainted, no means has been provided for locking the discharge end of the nozzle to the grease cup, and consequently, if more grease than is necessary to fill the grease cup is forced through the nozzle, the excess quantity of grease merely overflows the edge of the grease cup and is wasted. With my improved construction there is no chance for grease being wasted in this manner. Furthermore, it is possible completely to fill the grease cup with grease, which is a result impossible of being obtained with the old type of grease pumps for the reason that by the use of these pumps more or less air always became entrapped in the grease.

Another advantage of my construction lies in the fact that after the coupling member of my grease pump has been connected with the grease cup, the pump can be operated without paying any attention to the location of the grease cup.

While I have disclosed the preferred embodiment of my invention, it is to be understood that it is not limited to the details of the structure described, but is capable of other adaptations and modifications within the scope of the appended claims, some of which are broad enough to include constructions in which the grease cups are entirely dispensed with and means are provided for detachably connecting the grease pump with members having apertures formed therein for conveying grease to the parts to be lubricated.

Having thus described my invention, what I claim as new and desire to secure by Letters Patent of the United States is:

1. The combination with a grease pump having a discharge opening and a flexible discharge conduit provided at one end with a straight coupling and at the other end with an L-shaped coupling, of a grease cup and means on said grease pump and grease cup for co-acting with said couplings to interchangeably connect either end of said conduit with said pump and cup respectively.

2. The combination with a grease pump having a discharge opening and a discharge conduit provided at one end with a straight coupling and at the other end with an L-shaped coupling, of a grease cup and means on said grease pump and grease cup for co-acting with said couplings to interchangeably connect either end of said conduit with said pump and cup respectively.

3. A grease cup comprising a tubular member having screwthreads at one end and having the other end flanged inwardly to provide a closure seat, a closure, a pin extending through said tubular member and on both sides thereof, and a spring confined between said pin and closure and tending to hold said closure on said seat.

4. A grease cup comprising a tubular member having one end flanged inwardly to provide a closure seat, a closure, a pin extending through said tubular member and on both sides thereof, and a spring confined between said pin and closure and tending to hold said closure on said seat.

5. A grease cup comprising a tubular member having one end flanged inwardly to provide a closure seat, a closure, a pin extending inwardly and outwardly from one wall of said tubular member, and a spring confined between the inner end of said pin and said closure to hold said closure on its seat.

6. A grease pump having a discharge opening in combination with a discharge conduit having a straight coupling member at one end and an L-shaped coupling member at the other end, said couplings and pump being provided with co-acting means for connecting either of said couplings with said pump.

In witness whereof, I hereunto subscribe my name this 1st day of February, 1918.

ARTHUR V. GULLBORG.

Witnesses:
H. M. CAULTIS,
OSCAR RAHM.